(12) United States Patent
Melara

(10) Patent No.: US 9,216,616 B2
(45) Date of Patent: Dec. 22, 2015

(54) SELF-ORIENTING TWIN CASTOR WITH BRAKING ASSEMBLY

(71) Applicant: EMILSIDER MECCANICA S.P.A., Granarolo Dell'Emilia, Frazione Cadriano (IT)

(72) Inventor: Francescantonio Melara, Bologna (IT)

(73) Assignee: EMILSIDER MECCANICA S.P.A., Granarolo Dell'Emilia (IT)

( * ) Notice: Subject to any disclaimer, the term of this patent is extended or adjusted under 35 U.S.C. 154(b) by 0 days.

(21) Appl. No.: 14/356,716

(22) PCT Filed: Oct. 12, 2012

(86) PCT No.: PCT/EP2012/070299
§ 371 (c)(1),
(2) Date: May 7, 2014

(87) PCT Pub. No.: WO2013/068199
PCT Pub. Date: May 16, 2013

(65) Prior Publication Data
US 2015/0047148 A1    Feb. 19, 2015

(30) Foreign Application Priority Data
Nov. 9, 2011  (IT) .............................. BO2011A0640

(51) Int. Cl.
*B60B 33/00* (2006.01)
*B60B 33/02* (2006.01)

(52) U.S. Cl.
CPC ......... *B60B 33/0078* (2013.01); *B60B 33/0028* (2013.01); *B60B 33/0042* (2013.01);
(Continued)

(58) Field of Classification Search
CPC ... Y10T 16/19; Y10T 16/1853; Y10T 16/195; Y10T 16/216; B60B 33/0028; B60B 33/0042; B60B 33/0078; B60B 33/021; B60B 2900/112; B60B 2900/113; A45C 5/145
USPC .............. 16/18 R, 47, 35 R, 18 CG; 188/1.12
See application file for complete search history.

(56) References Cited

U.S. PATENT DOCUMENTS 3,914,821 A * 10/1975 Screen .......................... 16/35 R
4,077,088 A *  3/1978 Melara .............................. 16/47
(Continued)

FOREIGN PATENT DOCUMENTS

CN      101516642 A    8/2009
EP      0 287 825 A2   10/1988
(Continued)

OTHER PUBLICATIONS

International Search Report and Written Opinion dated Jan. 30, 2013 issued in PCT/EP2012/070299.

*Primary Examiner* — William Miller
(74) *Attorney, Agent, or Firm* — Scully Scott Murphy and Presser

(57) ABSTRACT

A self-orienting twin castor with a braking assembly is provided. A main body of the castor rotatably mates with a base of an installation device. The body has a through hole for rotatably accommodating a shaft having two coupling ends for respective wheels, with play along a vertical direction. Elastic means are arranged within a transverse channel of the through hole of the body. The main body has two tubular lateral portions, which are coaxial with the through hole and adapted to accommodate a sleeve of a respective wheel fitted on a coupling end of the shaft. A portion of the castor has, along its inner surface, at least one radially protruding slider parallel to the axis of the shaft.

7 Claims, 5 Drawing Sheets

(52) U.S. Cl.
CPC ......... *B60B33/021* (2013.01); *B60B 2900/112* (2013.01); *B60B 2900/113* (2013.01); *Y10T 16/195* (2015.01)

(56) References Cited

U.S. PATENT DOCUMENTS

| | | | |
|---|---|---|---|
| 4,219,904 A | 9/1980 | Melara | |
| 4,290,166 A * | 9/1981 | Melara | 16/47 |
| 6,615,448 B2 * | 9/2003 | Melara | 16/35 R |
| 7,200,895 B2 * | 4/2007 | Dayt | 16/47 |
| 7,647,673 B2 * | 1/2010 | Melara | 16/35 R |
| 8,015,664 B2 * | 9/2011 | Berger et al. | 16/47 |

FOREIGN PATENT DOCUMENTS

| | | |
|---|---|---|
| EP | 0645262 A1 | 3/1995 |
| EP | 1110757 A2 | 6/2001 |
| FR | 2376003 A1 | 7/1978 |
| GB | 2025220 A | 1/1980 |

\* cited by examiner

SELF-ORIENTING TWIN CASTOR WITH BRAKING ASSEMBLY

BACKGROUND

The present invention relates to a self-orienting twin castor with braking assembly.

The "twin" castor is constituted by a pair of wheels which are rotatably mounted on a common axle. The axle is accommodated within a support which comprises a vertical wall which extends between the wheels and is midway between a sort of fairing that covers the castor above: the support is specifically provided with a true hub for the accommodation of the shaft. In the vertical part a well is provided which is open upward and rotatably supports a vertical auto-orientation pin. The hub is adapted to define an engagement seat for an axial shank of the wheels; such seat is generally coaxial to the hole in which the shaft of the wheels is engaged.

The shank is retained in the respective seat (so as to prevent its accidental egress during use) by the interference of an annular portion of the hub: in the insertion step of the wheel an abutment thereof and a part of the annular portion undergo an elastic deformation until the annular portion is overcome by the abutment; naturally the abutting of the abutment on the annular portion, in the operating configuration of the castor, makes an accidental egress impossible.

In this type of castor the braking assembly, which is provided in the hub of the central support, comprises elastic means that are adapted to keep the shaft on which the wheels are mounted resting on respective abutments which protrude inside the hub.

The twin castors are constituted by a pair of wheels mounted on the same shaft, which is rotatably inserted in the support.

Various braking systems are in use which operate outside the hub of the central support. In the specific case of those types which operate inside the hub, a number of systems are known. For example, twin castors comprising the respective braking assemblies on both wheels: in particular, these can have two teeth which are partly integrated in the hub of the support. These teeth provide a cylindrical braking contact surface that interacts with the inner diameter of the wheels (or rollers or disks) so as to provide two braking jaws.

The apparatuses that produce the supports made with such braking assemblies are very expensive and complex, since they must necessarily have molding trolleys for these teeth in the molding apparatuses. In addition to this, the presence of the teeth that support the braking jaws complicates the steps of assembly, since the larger inner diameter of the wheels (or rollers or disks) must necessarily exceed the diameter of the braking jaw (which is smaller than the wheels) before being positioned in its seat.

In this manner the assembly time is delayed. Another system is that which uses a single, centrally-supported slider, which is arranged vertically with respect to the rotation axis. This system, owing to the position in which it is arranged, sometimes does not exert a constant braking action because possible oily residues can be deposited thereon by gravity.

SUMMARY

The aim of the present invention is to solve, at least partially, the above problems, by providing a self-orienting twin castor with braking assembly which is easily and immediately assembled, while offering particularly efficient braking action.

Within this aim, an object of the invention is to provide a self-orienting twin castor with braking assembly which is simple to produce, adopting molds constituted by a minimal number of parts.

Another object of the present invention is to provide a self-orienting twin castor with braking assembly which is low-cost, easily and practically implemented and safe in application.

This aim and these objects are achieved by a self-orienting twin castor with braking assembly of the type comprising a main body, designed for rotatable mating with the base of an installation device, said body being provided with at least one through hole for accommodating rotatably, with play along a substantially vertical direction, a shaft that has two coupling ends for respective wheels, elastic means being arranged within a transverse channel of said through hole of said body and being forcibly interposed between said shaft and said body for keeping, when said castor is not subjected to a load imposed by said installation device, said shaft forcibly resting, directly or indirectly, against said body, with consequent braking of the rotation of the associated wheels, characterized in that said main body comprises two tubular lateral portions, which are coaxial to said hole and are adapted to accommodate a sleeve of a respective wheel which is fitted on a coupling end of said shaft accommodated in said hole, at least one of said portions comprising, along its inner surface, at least one radially protruding slider, which is conveniently shaped and parallel to the axis of said shaft, in said condition of absence of load on the castor, said sleeve of said wheel forcibly resting on the at least one slider by the action of said elastic means, with consequent braking of the rotation of said wheel.

BRIEF DESCRIPTION OF THE DRAWINGS

Further characteristics and advantages of the invention will become more apparent from the description of a preferred, but not exclusive, embodiment of the self-orienting twin castor with braking assembly according to the invention, which is illustrated by way of non-limiting example in the accompanying drawings wherein.

DETAILED DESCRIPTION OF EXEMPLARY EMBODIMENTS

Figure 1:
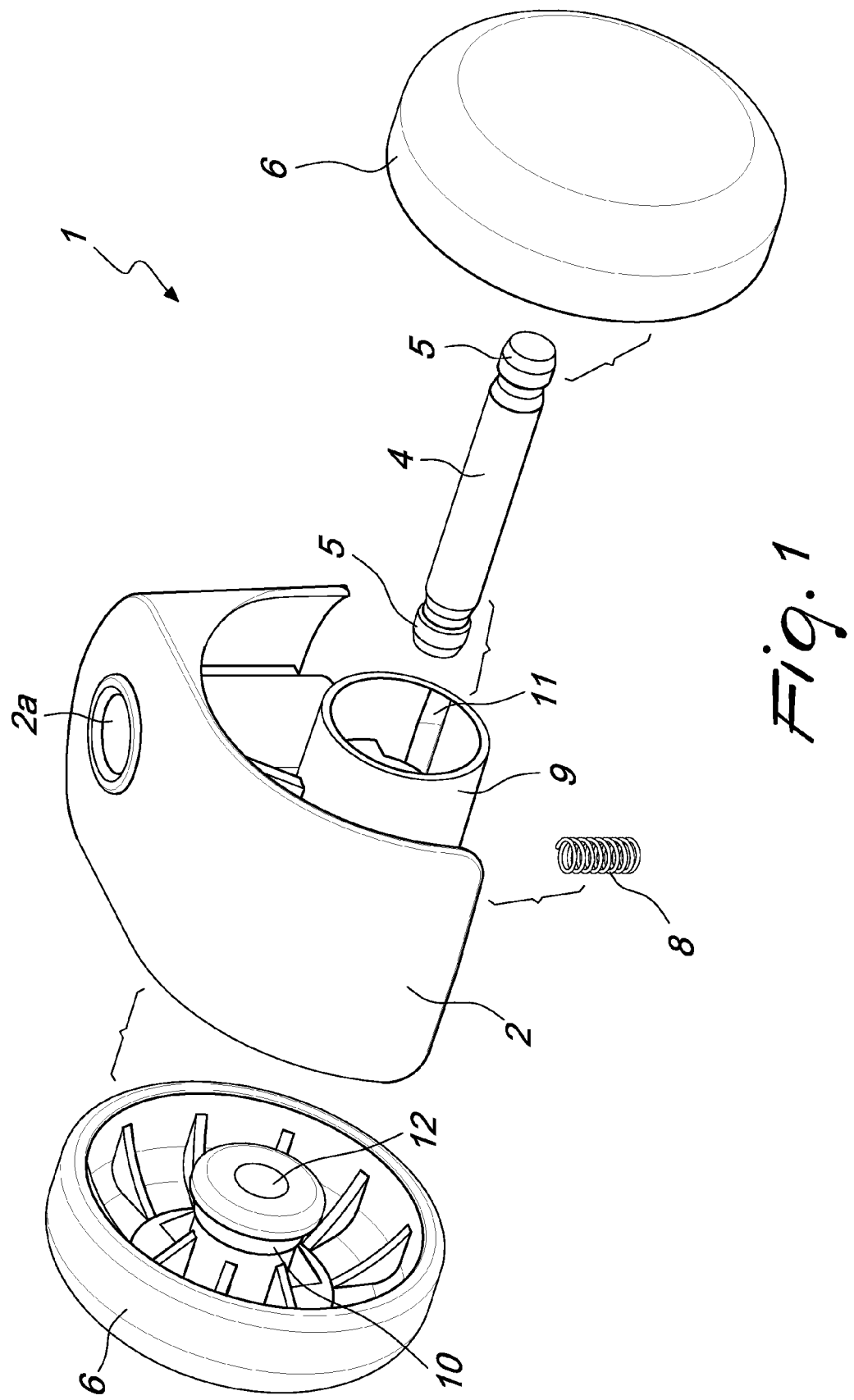
FIG. 1 is an exploded axonometric view of a self-orienting twin castor with braking assembly according to the invention.
Figure 2:
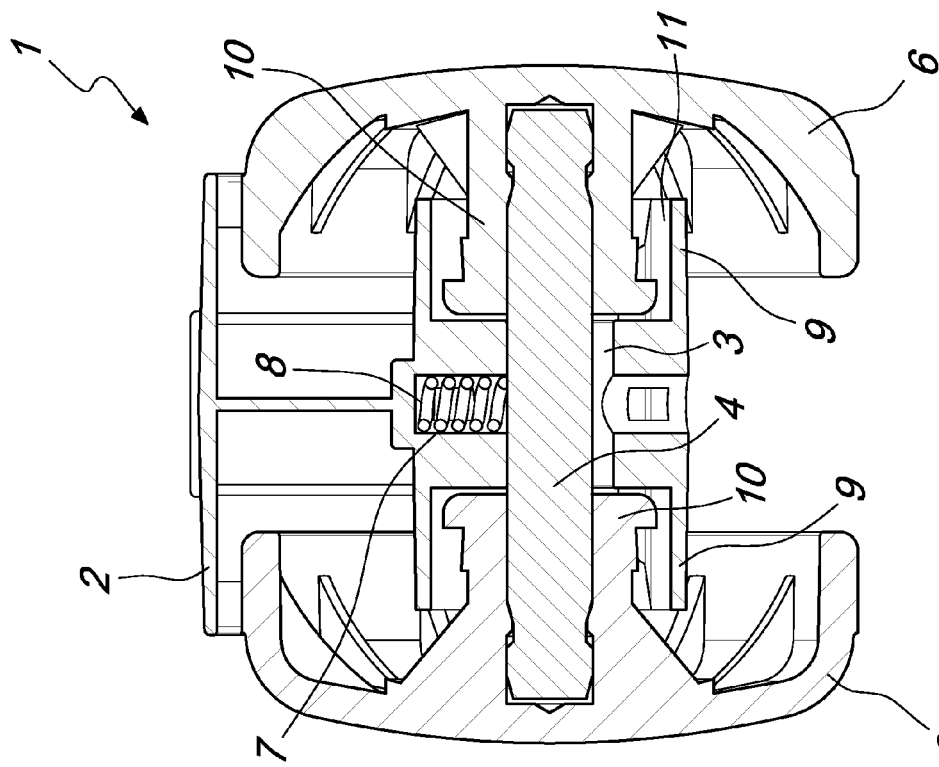
FIG. 2 is a transverse cross-sectional view along a vertical plane of the twin castor in FIG. 1 in the configuration wherein the wheels are braked.
Figure 3:
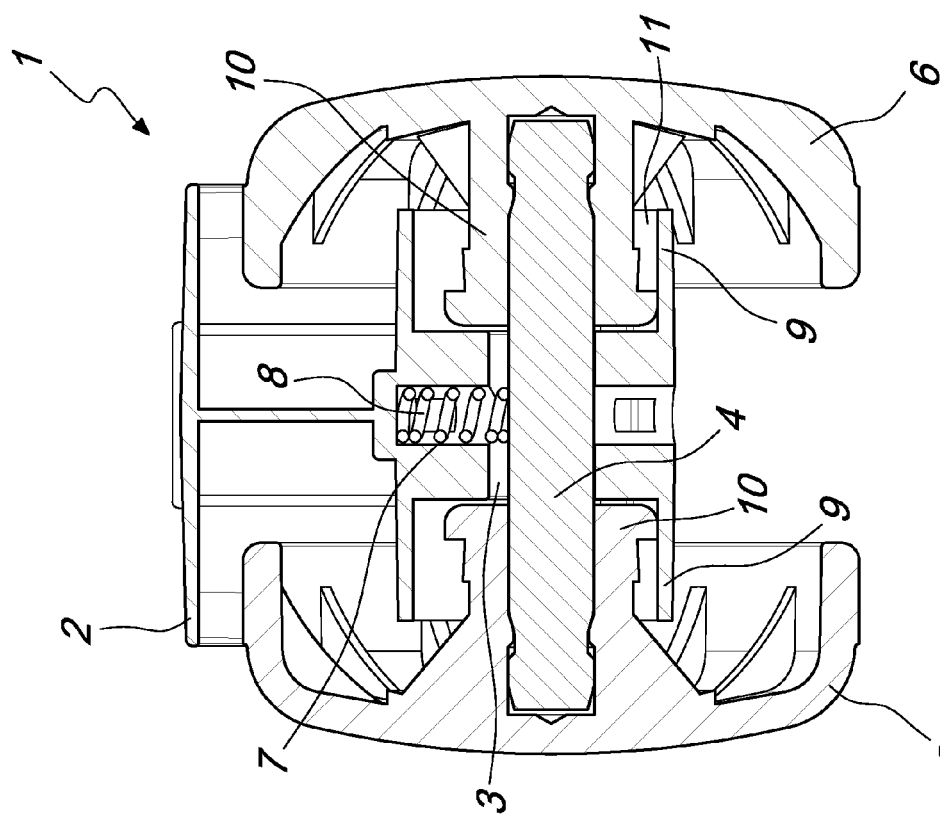
FIG. 3 is a transverse cross-sectional view along a vertical plane of the twin castor in FIG. 1 in the configuration wherein the wheels freely rotate.
Figure 4:
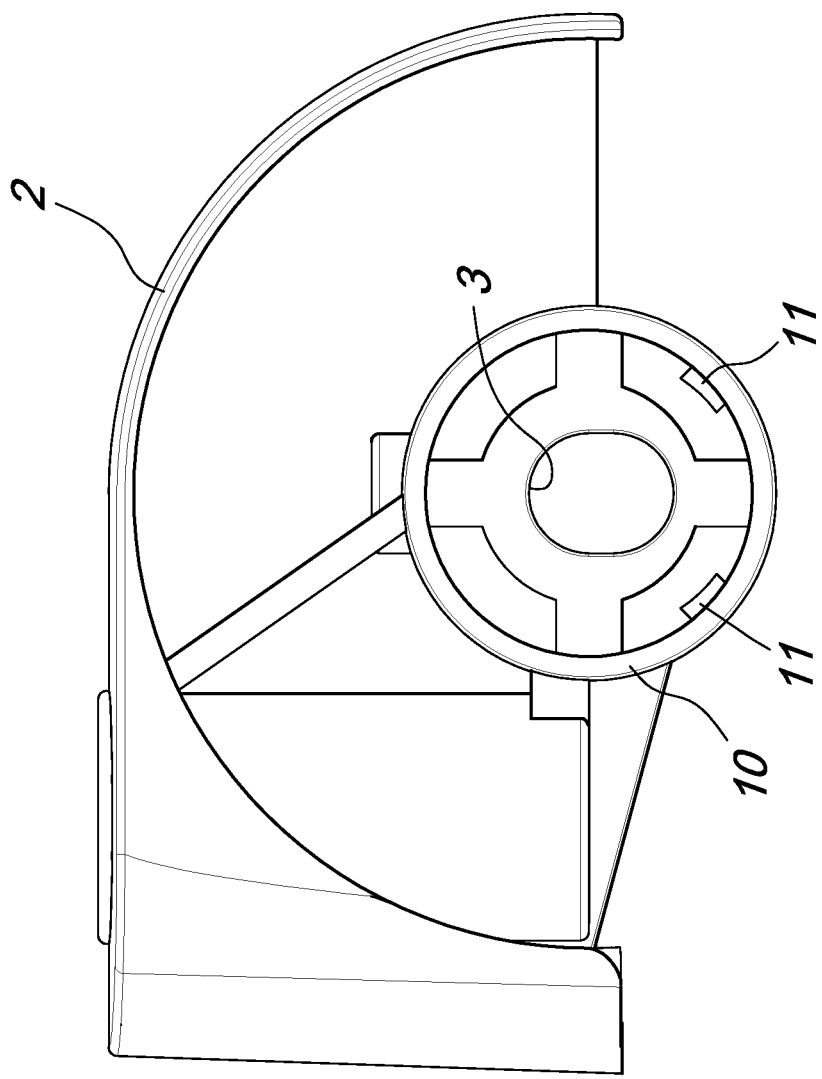
FIG. 4 is a side view of a component of the twin castor in FIG. 1.
Figure 5:
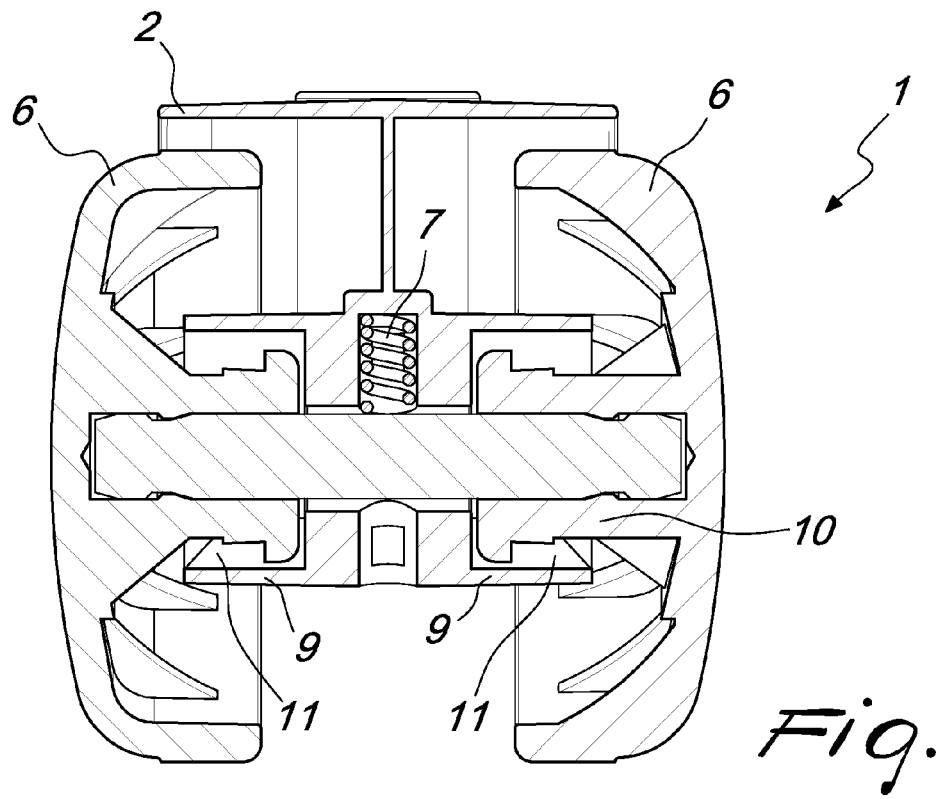
FIG. 5 is a transverse cross-sectional view along a vertical plane of the twin castor with a possible different embodiment of a braking assembly according to the invention.
Figure 6:
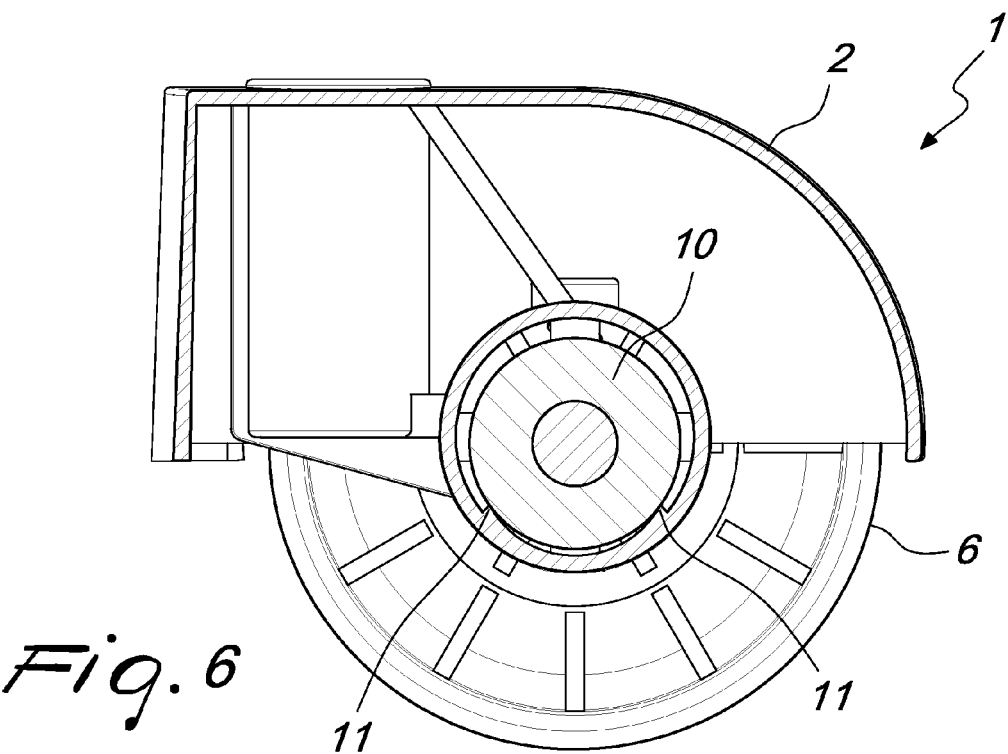
FIG. 6 is a sectional view along a plane perpendicular to the axle of the wheels of the twin castor in FIG. 5.
Figure 7:
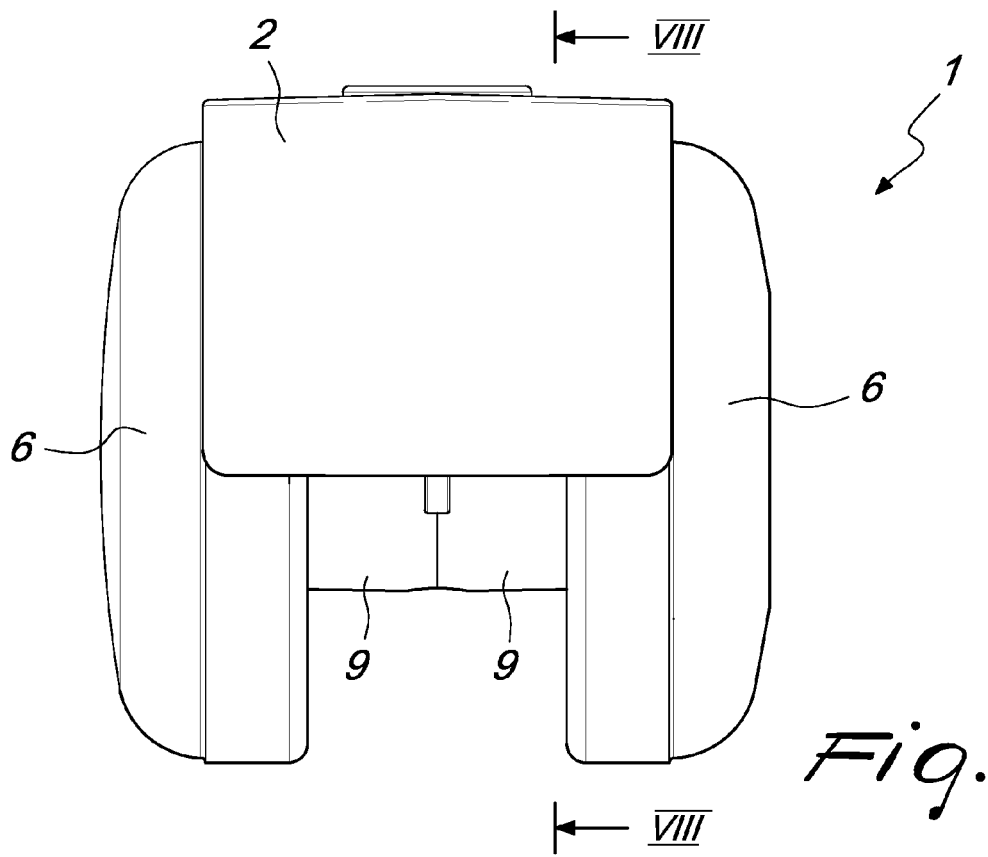
FIG. 7 is a front elevation view of the self-orienting twin castor with braking assembly according to the invention.
Figure 8:
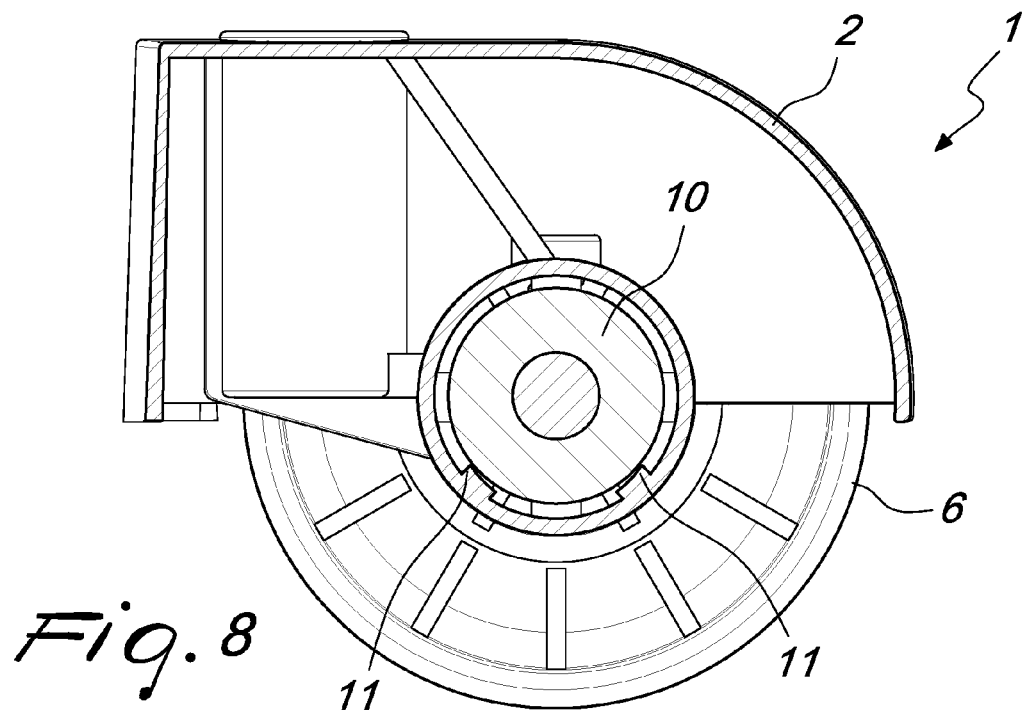
FIG. 8 is a sectional view along the line VIII-VIII shown in FIG. 7.

With particular reference to the figures, the reference numeral 1 generally designates a self-orienting twin castor with braking assembly. The self-orienting twin castor 1 comprises a main body 2, which is designed for rotatable mating with the base of an installation device (for example a seat, an armchair and the like).

Such coupling occurs by insertion of an adapted pin of the installation device into the seat 2a: such seat 2a rotatably accommodates the pin thus ensuring the auto-orientation of the castor 1.

Such body 2 is provided with at least one through hole 3 for accommodating rotatably, with play along a substantially vertical direction, a shaft 4 with two coupling ends 5 for respective wheels 6.

Arranged in a transverse channel 7 of the through hole 3 of the body 2 are elastic means 8 which are forcibly interposed between the shaft 4 and the body 2.

When the castor 1 is not subjected to a load imposed by the installation device (for example the weight of a person sitting on the seat), the elastic means 8 are adapted to keep (by elastic action) the shaft 4 forcibly resting, directly or indirectly, against the body 2, with consequent braking of the rotation of the associated wheels 6.

According to an embodiment of predominant practical and applicative interest, the main body 2 comprises two tubular lateral portions 9, which are coaxial to the hole 3 and are adapted to accommodate a sleeve 10 of a respective wheel 6 which is fitted on a coupling end 5 of the shaft 4 accommodated in the hole 3.

At least one of such portions 9 comprises, along its inner surface, at least one radially protruding slider 11: the slider 11 is elongated in shape and is parallel to the axis of the shaft 4.

In the condition of absence of load on the castor 1, the sleeve 9 of such wheel 6 forcibly rests on the at least one slider 11 due to the action of the elastic means 8, with consequent braking of the rotation of the corresponding wheel 6.

Note that, if an embodiment is adopted in which a single slider 11 is present, it is conveniently shaped so as to ensure contact with the sleeve 10 according to portions of limited breadth, corresponding to the environment of the generatrices of its surface.

More specifically this embodiment is obtainable by providing a single slider 11 with an inner surface (the surface facing the sleeve 10) which is substantially frustum-shaped: this will ensure that the braking of the sleeve 10 will be achieved along the corner edges of the slider 11 thus shaped and then, if the load determines small elastic deformations, on surfaces that are contiguous thereto.

With particular reference to a practical application of particular efficiency, both tubular portions 9 of the main body 2 comprise at least one respective slider 11, for braking both wheels 6 in a condition of absence of load on the castor 1.

With regard to the embodiments that are considered most efficient and functional, it is possible for the sliders 11 of the tubular portion 9 to be two in number, and arranged along inclined planes, with respect to the vertical plane which contains the axis of the shaft 4.

In practice the optimal operation of the castor 1 is found at an inclination of the sliders by an angle that is such as to create two supports, with respect to the vertical plane, that generate a cone of support that is such as to assist the braking effect: the two sliders 11, naturally, will be arranged mirror-symmetrically with respect to such vertical plane.

The possibility is not excluded of arranging the two sliders 11 in conditions that do not follow the symmetry with the vertical plane.

Normally, when at least two sliders 11 are adopted, they are not arranged along the vertical plane that passes through the axis of the shaft 4 since, in that position, there may be oily residues of lubricants inserted in the moving parts. Naturally, as a result of gravity and use, such oily residues may tend to accumulate in the lower part of the vertical plane of the tubular portion 9 that passes through the axis of the shaft 4. Such residues could reduce the braking action.

Naturally, it is possible to provide more than two sliders 11 on each portion 9 in order to obtain a braking action of maximum effectiveness.

It is particularly important to stress that each one of the sliders 11 preferably has a shape structure of the type of an annular segment with a preset angular breadth.

The surface directed toward the inside of the portion 9 of such segment is advantageously complementary to that of the sleeve 10 of the respective wheel 6 and faces it and is proximate to it in the configuration for use.

Naturally, given that such components are provided with complementary surfaces, upon a braking action determined by the action of the elastic means 8 (which press at least one part of the sleeve 10 against the sliders 11), there will be an increase in the reciprocal friction (which is proportional, with the same friction coefficients of the surfaces and with the same force applied, to the breadth of the contact surfaces) thus ensuring a better braking action.

The sleeve 9 of a respective wheel 6 can conveniently comprise an axial internal duct 12 for the accommodation of the respective coupling end 5 of the shaft 4.

According to this embodiment, the end 5 comprises an end shape and the internal duct 12 comprises a corresponding complementary shape for the stable coupling, following the mutual elastic forcing of at least one portion of the shape and of the complementary shape, of such duct 12 with the end 5.

The accommodation hole 3 of the shaft 4 is, according to an embodiment known to be particularly advantageous in practical and applicative terms, a slot that in a substantially vertical direction is wider than in a substantially horizontal direction: this allows the shaft 4 to perform a translational motion in the vertical direction (by the action of elastic means 8 and of the weight applied on the installation device) thus making the castor 1 pass from the braked configuration (sleeves 10 forcibly resting against the sliders 11) to the configuration of free rotation of the wheels 6 (sleeves 10 separated from and facing the respective sliders 11).

With regard to the various embodiments described previously, note that the elastic means 8 can preferably be constituted by an axially acting spring.

Such spring will in such case be inserted in the respective transverse channel 7 of the through hole 3 of the body 2 before arranging the shaft 4 inside the hole 3.

As can easily be seen from the figures, the seat 2a is eccentric with respect to the axis of the shaft 4.

The body 2, which is the part of the castor that is best visible to the end user, can be customized as a function of specific requirements on shape, color and surface characteristics. It can be provided with one or more reinforcement ribs for strengthening the structure. It can also be suitably lightened in the regions that are not subjected to loads, so as to reduce its weight and cost (these particular characteristics can also be seen in the accompanying figures).

In any case, if structured thus, each portion 9 does not require particular technical contrivances for the provision of the injection moulding apparatus.

Once the wheels 6 are inserted in the ends 5 of the shaft 4, they can freely rotate about the shaft 4 itself, while preventing axial removal thanks to the stable coupling of the respective shapes and counter-shapes.

In the configuration corresponding to the free rotation of the wheels 6, the shaft 4 (which supports the wheels 6) comes to rest against the upper part of the hole 3 (which as said previously is actually a slot), and the sleeves 10 will be proximate to the upper surface of the respective portions 9.

This occurs because the shaft 4 acts on the elastic means 8, compressing them as a result of an external action, thus allowing the wheels 6 to freely rotate.

In the configuration corresponding to the braking of the rotation of the wheels 6, the shaft 4 rests against the lower part of the hole 3 (which as said previously is actually a slot), and the sleeves 10 will rest against the sliders 11. The elastic action performed by the means 8 will force, if not loaded with the weight generated by a user of the installation device, the axle 4 into its position for braking the wheels 6 (i.e. when the sleeves 10 are stably resting against the sliders 11 thus preventing, by friction, the rotation of the wheels 6).

Advantageously the present invention solves the above problems, by providing a self-orienting twin castor 1 with braking assembly which is easily and immediately assembled.

Positively the self-orienting twin castor 1 minimizes the risk of subjecting the components to excessive stresses during assembly. This is because keeping the wheels 6 in position is ensured solely by the correct coupling of the shape of the end 5 with the complementary shape present in the duct 12: thus, the sliders 11, by performing only the action of hard standing braking of the castor 1, are not subjected to forces during assembly.

Conveniently the castor 1 has a particularly efficient braking action: this is because of the position of the sliders 11 (which, in the most efficient embodiments, is not subjected to falling lubricant residues) and to their shape which is complementary to that of the sleeves 10 (so as to increase the contact surface).

Conveniently the twin castor 1 is simple to produce since it can be made by adopting molds which are constituted by a minimal number of parts: special mobile trolleys are not in fact necessary in the molds for the body 3 and for the wheels 6, given that these have a very simple shape.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. BO2011A000640 from which this application claims priority are incorporated herein by reference.

The invention claimed is:

1. A self-orienting twin castor with braking assembly, comprising:
   a main body, configured to rotatably mate with the base of an installation device, said body having at least one through hole,
   a shaft comprising two coupling ends for respective wheels, wherein said shaft is rotatably accommodated in said at least one through hole with play being provided along a substantially vertical direction,
   elastic means being arranged within a transverse channel of said at least one through hole and being forcibly interposed between said shaft and said body for keeping said shaft forcibly resting, directly or indirectly, against said body, such that when said castor is not subjected to a load imposed by said installation device, rotation of the associated wheels is braked,
   wherein said main body comprises two tubular lateral portions,
   wherein said tubular lateral portions are coaxial to said at least one through hole and are adapted to accommodate a sleeve of a respective wheel fitted on a coupling end of said shaft accommodated in said hole,
   wherein at least one of said portions comprises an inner surface and at least one radially protruding slider provided on the inner surface,
   wherein said at least one radially protruding slider is shaped and parallel to the axis of said shaft, said sleeve of said wheel comprises an enlarged terminal end portion having the shape of a circular disc, and when said castor is not subjected to the load imposed by said installation device, said enlarged terminal end portion of said sleeve forcibly rests on the at least one slider by the action of said elastic means, thereby braking the rotation of said wheel.

2. The twin castor according to claim 1, wherein both tubular portions of said main body comprise at least one respective slider, for braking both wheels in a condition of absence of load on the castor.

3. The twin castor according to claim 1, wherein said sliders of said tubular portion are two in number, which are arranged along planes which are inclined with respect to the vertical plane that contains the axis of the shaft.

4. The twin castor according to claim 1,
   wherein each one of said sliders has a shape of an annular segment that has a predefined angular breadth,
   wherein the surface of said segment, which surface is directed toward the inside of said tubular portion is complementary to a surface of said sleeve of the respective wheel, and
   wherein said surface of said segment and said of said sleeve face each other and are configured to approximate each other in use.

5. The twin castor according to claim 1, wherein said sleeve of a respective wheel comprises an axial internal duct for the accommodation of the respective coupling end of said shaft, said end comprising an end shape and said internal duct comprising a corresponding complementary shape for the stable coupling, following the mutual elastic forcing of at least one portion of said shape and of said complementary shape, of said duct with said end.

6. The twin castor according to claim 1, wherein said through hole of said shaft is a slot that in a substantially vertical direction is wider than in a substantially horizontal direction.

7. The twin castor according to claim 1, wherein said elastic means are constituted by an axially acting spring, said spring being inserted in the respective transverse channel of said through hole of said body before arranging said shaft within said hole.

* * * * *